March 27, 1956
F. F. OFFNER
2,739,478
APPARATUS FOR MEASURING MASS GAS FLOW AND
APPLICATION THEREOF TO GAS-LIQUID
RATIO CONTROL SYSTEM
Filed April 14, 1950
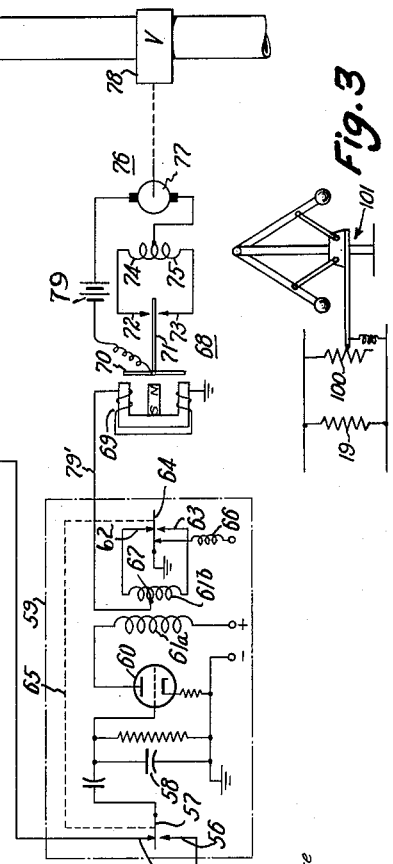
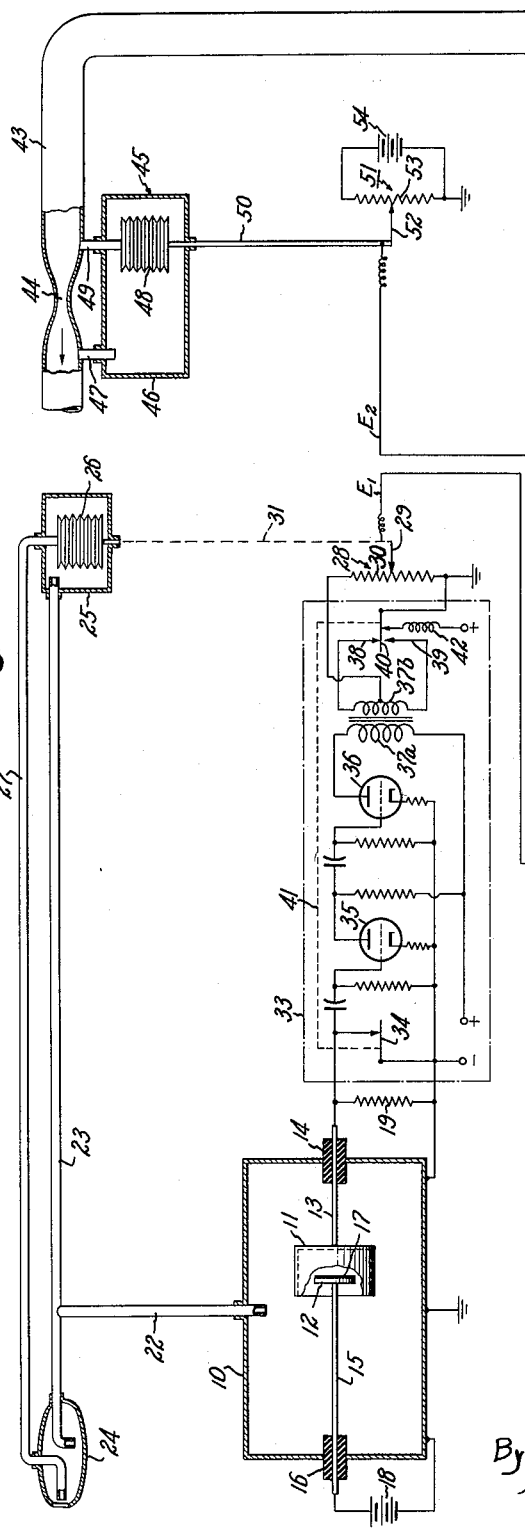
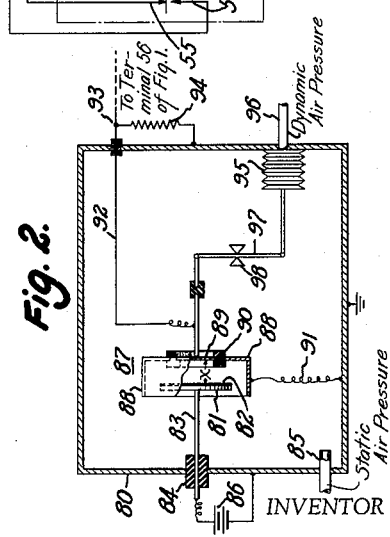
INVENTOR
Franklin F. Offner.
By
Pierce, Scheffler & Parker
ATTORNEYS United States Patent Office 2,739,478
Patented Mar. 27, 1956

2,739,478

APPARATUS FOR MEASURING MASS GAS FLOW AND APPLICATION THEREOF TO GAS-LIQUID RATIO CONTROL SYSTEM

Franklin F. Offner, Chicago, Ill.

Application April 14, 1950, Serial No. 155,942

11 Claims. (Cl. 73—196)

The present invention relates to an improved and more accurate device for measuring mass flow of a gas and a novel system utilizing measured output of the device for maintaining a desired ratio between the rate of flow of a liquid such as for example, gasoline and the mass flow of a gas such as combustion air which are to be admixed in a combustion chamber.

A specific object is to provide an improved device which combines measurement of the density of a gas with a measurement of its velocity to thereby determine the mass gas flow, the results being extremely accurate over a wide range of pressures and temperatures of the gas.

A more specific object of the invention is to provide an improved device of the electrical type for measuring mass flow of a gas, the measured output of which is constituted by the product of a resistance and current passed through it, one of these factors being varied proportionally to variation in dynamic gas pressure and the other varied proportionally to variation in gas density.

Another specific object is to provide a device for measuring mass flow of a gas comprising an ionization chamber containing two spaced electrodes between which ionizing current is made to flow, the interior of the chamber being subjected to the gas at its static pressure and the spacing between the electrodes being varied proportionally to changes in the dynamic pressure of the gas whereby the current amplitude becomes a measure of the mass gas flow.

Still another object is to provide an improved device for measuring true gas speed.

The foregoing as well as other objects and advantages inherent in the invention will become more apparent for the following description and accompanying drawings illustrating a preferred constructional embodiment thereof as applied to the measurement of mass flow of air and the use thereof in conjunction with a control system for maintaining a desired ratio between mass air flow and liquid fuel flow such as is often desirable in connection with the operation of combustion engines.

Fig. 1 is a diagrammatic view of the system and its components;

Fig. 2 is a diagrammatic view of a modified construction of the component in Fig. 1 by which mass air flow is measured; and Fig. 3 is a detailed partial circuit diagram illustrating a modified embodiment of the invention.

The dynamic pressure of a moving gas such as air can be expressed by the formula $\rho V^2 \div 2$ wherein $\rho$ is the gas density and V its linear velocity. The mass flow of the gas is however a function of $\rho V$ rather $\rho V^2$. Hence the dynamic gas pressure does not therefore give a direct measure of the mass air flow.

The density of the gas depends both upon its pressure and its temperature. Correction of the dynamic gas pressure for both pressure and temperature of the gas in order to determine mass gas flow is most difficult to accomplish with any satisfactory degree of accuracy where the temperature or the pressure is subject to variation over a wide range. In my improved device which will now be described, the necessary correction is effected in a most simple and accurate manner, specifically by use of the ionizing power of alpha particles to produce a corrective factor that varies with the air density.

Alpha particles are the nuclei of helium atoms. They have a positive charge of two and a mass of four units. Because of their high mass-to-charge ratio, alpha particles have a very high ionizing power. As a result, the alpha particles as for example those emitted from polonium produce 20,000 ion pairs per centimeter of travel, at normal air temperatures and pressures. This ionizing power remains almost constant during the early part of the range of the alpha particle. Since the total range of an alpha particle from polonium, under normal conditions, is about six centimeters, the alpha particles may be allowed to travel through at least one centimeter of air (under normal conditions), and will produce a number of ion pairs directly proportional to the density of the air through which the particles have passed. By placing two electrodes in a chamber through which the alpha particles pass, and placing a sufficiently high voltage difference on such electrodes, all the ion pairs produced may be "swept up," and the resultant current will thus be very exactly proportional to the density of the air.

With reference now to Fig. 1, the air density measuring device is comprised of a chamber 10 whose walls are made of electrically conductive material and within which are supported two electrodes 11, 12 in spaced relation. Electrode 11 formed as a cylindrical cup is carried by a rigid conductive rod 13 which extends through and supported by an insulating bushing 14 mounted in one end wall of chamber 10. The other electrode 12 formed as a cylindrical disc is similarly carried by a rigid conductive rod 15 extending through and supported by an insulating bushing 16 mounted in the opposite end wall of chamber 10.

Electrode 12 carries a source of alpha particles such as would be provided by a thin layer 17 of polonium deposited on its front surface i. e. the surface facing cup electrode 11, and is surrounded on all but its rear size by electrode 11. This is done to insure that substantially all ion pairs formed by the action of the alpha particles emitted from the polonium layer 17, will be swept up by electrodes 11, 12 and that few will find their way directly to the walls of chamber 10.

A unidirectional voltage sufficient to sweep up all the ions produced between electrodes 11, 12 is applied to electrode 12, such voltage being represented conventionally by the battery symbol 18, the positive terminal of which is connected to the protruding end of rod 15 and the negative terminal being connected to a wall of chamber 10 which is preferably "grounded." The voltage applied to electrode 12 is not too critical and will depend somewhat on the spacing between electrodes 11, 12 and also the air pressure. I have found that with an electrode spacing of 1/8" and normal atmospheric pressures encountered, an applied voltage of 500 volts is quite satisfactory. The voltage should not be so high however as to be apt to cause an "arc-over" between the electrodes.

Electrode 11 is insulated from the walls forming chamber 10 and connects with one end of a high resistance 19. The other end of resistance 19 is connected to the wall of chamber 10. The ionization current then flows through resistance 19 producing a voltage drop across it that serves as an output signal proportional to the air density within chamber 10. The latter connects with the source of static air pressure through a tube 22 which branches off the main static air pressure tube 23 leading from an air pick-up head 24 to a device by means of which the dynamic air pressure is ascertained and which will next be described.

The results of actual experimental tests show that for a given constant air temperature the current output from the ionization chamber 10 of Fig. 1 is directly proportional to variation in the static air pressure and hence air density within the chamber. It has also been proven by experimental tests that the current output is dependent only upon air density when the temperature is varied. Thus the current output from the ionization chamber is accurately proportional to the density of the air for any temperature and pressure within a normal operating range.

The dynamic air pressure, $\rho V^2 \div 2$ (where $\rho$=air density and V its velocity) is proportional to the force produced on a surface by air of velocity V and density $\rho$ which impinges upon the surface. If the surface is yieldingly restrained from motion, such motion will be proportional to the dynamic pressure. Such a device is shown in Fig. 1 and is seen to comprise a casing 25 containing a bellows unit 26 the interior of which is subjected to the dynamic pressure of the air entering head 24 by means of air tube 27. The exterior of bellows unit 26 is subjected to static pressure of the air by means of air tube 23 which terminates within casting 25. Thus the bellows unit 26 will be expanded or contracted as the case may be upon a rise or fall in dynamic air pressure and constitutes a measure of the same.

Displacement of bellows 26 is converted into a corresponding change in an electrical value by means of a potentiometer 28, the slider element 29 of which is moved along the resistance unit 30 by means of rod 31 connected to bellows 26. By making the motion of all members as well as resistor 30 linear, the resistance value R of resistor 30 at any instant as determined by the position of slider element 29 is made proportional to the dynamic air pressure. That is:

$$R = K_1 \frac{\rho V^2}{2} \tag{1}$$

In Equation 1, $K_1$ is a constant.

The voltage appearing across resistance 19 is amplified in a multi-stage electronic amplifier 33 of the "chopper" type which is particularly well suited to amplification of small unidirectional voltages. The input signal from resistance 19 is periodically grounded through contacts 34 which are maintained in sustained vibration. The chopped signal thus acquires an essentially alternating current component that is amplified in succession through two stages 35, 36. The output of the final stage 36 is applied to the primary 37a of a transformer and the terminal ends of the transformer secondary 37b are connected to stationary contacts 38, 39 between which a movable reed contact 40 is vibrated. Contact 40 vibrates synchronously with contacts 34 as indicated schematically by the linkage 41 and hence the transformer output will be rectified thereby producing an amplified voltage exactly proportional to amplitude of the voltage across resistance 19, and which is taken out from a midtap on transformer secondary 37b and applied to the ungrounded end of potentiometer resistor 30. The vibrator coil for the movable contacts of the amplifier is shown schematically at 42.

The current I through resistor 30 is thus proportional to the density $\rho$ of the air within the ionization chamber 10, and thus proportional to the static air density. That is:

$$I = K_2 \rho \tag{2}$$

Referring to Equation 1 above, it is seen that the voltage E appearing at the point of contact between slider 29 and resistor 30 is expressed by the equation $$E_1 = IR$$
$$= K_1 K_2 \frac{\rho^2 V^2}{2}$$
$$= K_3 \rho^2 V^2 \tag{3}$$

The voltage $E_1$ is thus proportional to the square of the mass air flow, and is the product of the air density factor (current I) and dynamic air pressure factor (resistance R). It is understood that the mass flow is measured through a duct at a station of known cross-sectional area so that in the expression for mass flow, the area factor is included in the constant, as for example in constant $K_3$ above.

To measure the rate of flow of fuel through pipe 43 to an engine (not shown) a portion of the pipe is necked down to provide an orifice 44 that gives rise to a differential pressure on opposite sides thereof which is utilized in a gauge 45 to produce a mechanical movement which varies with variation in fuel flow. Gauge 45 is comprised of a casing 46 the interior of which is placed in communication with pipe 43 on the downstream side of orifice 44 by means of tube 47. A bellows unit 48 located within casing 46 has its interior connected to fuel pipe 43 via tube 49 on the upstream side of orifice 44. Displacement of bellows 48 and the rod 50 attached thereto will vary as the difference in pressure between the interior of casing 46 and the interior of bellows 48 and since such pressure difference P is proportional to the square of the velocity F with which the fuel flows through the orifice 44, the displacement of rod 50 will likewise be proportional to the square of the fuel flow velocity.

As with the device previously described for measuring air density, displacement of rod 50 is converted into a corresponding change in an electrical factor by means of a potentiometer 51 comprised of a slider element 52 connected to the lower end of rod 50 and resistance unit 53 which is energized from a source of unidirectional voltage of fixed amplitude represented by battery 54. The potentiometer voltage $E_2$ at the point of connection between slider 52 and resistance 53 will thus likewise be proportional to the square of the fuel flow velocity F, that is $$E_2 = K_4 F^2 \tag{4}$$

Comparing Equations 3 and 4 it is seen that if $E_1 = E_2$, then $\rho V = K_6 F$. By providing some means for making the two voltages $E_1$ and $E_2$ equal, the ratio of mass air flow to fuel flow is made a constant, and can be kept at any desired value by means of the apparatus now to be described.

The two voltages $E_1$, $E_2$ are applied to stationary contacts 56, 55 respectively between which is operated a reed contact 57, the latter engaging the stationary contacts in an alternate manner continuously. Condenser 58 connected to contact arm 57 will thus be charged alternately to the two voltages $E_1$ and $E_2$. When the latter are equal, no change in the condenser voltage will occur; but when they are different, a continuously fluctuating voltage will be produced at condenser 58 which is then amplified in a chopper type vacuum tube amplifier 59. The output from amplifier tube 60 is applied to primary 61a of an output transformer, and the terminal ends of the transformer secondary 61b are connected to spaced stationary contacts 62, 63 between which is operated a reed contact 64. As in the amplifier 33 associated with the density measuring device, reed contacts 57 and 64 are operated synchronously as indicated by linkage 65 from a driver coil 66, and contact 64 in conjunction with stationary contacts 62, 63 serves to rectify the amplified output so that the voltage appearing at the output tap 67 of transformer secondary 61b will have an amplitude proportional to the difference, if any, between input voltages $E_1$ and $E_2$, and a polarity determined by the sense of difference.

For controlling fuel flow, use can be made of a polarized relay 68 having a winding 69 and pivotally mounted armature 70 carrying a contact arm 71 which moves between two stationary contacts 72, 73 connected to separate field windings 74, 75 of reversible motor 76. The armature 77 of this motor is coupled to a valve 78 in fuel line 43 in such manner that rotation of the armature in one direction will adjust the valve to a more closed position while rotation in the opposite direction will cause the valve to be opened more. The power source for the motor is indicated at 79. One end of relay winding 69 is connected via conductor 79' to the mid tap 67 on transformer secondary 61b and the other end of the relay winding is connected to "ground" as is also the reed contact 64.

If the output is for example "positive" in potential, relay armature 70 will swing in one direction to effect engagement between contact arm 71 and contact 72, for example, causing current to flow from power source 79 through armature 77 and field winding 74 and thereby to rotate the armature in such direction as will cause fuel valve 78 to move to a more open position and thereby increase fuel flow.

Should the output be "negative" in potential, armature 70 will swing in the opposite direction to send current through motor armature 77 and the other field winding 75 causing rotation of the armature in the opposite direction to shift the fuel valve 78 to a more closed position.

If the output from transformer secondary 61b is zero (which is the case when $E_1=E_2$ which occurs when the ratio of mass air flow to fuel flow is equal to the value desired to be maintained) motor armature 77 will of course stand still and no change in the setting of valve 78 will be effected.

In this manner, fuel valve 78 may be closed more or opened more automatically as required to reestablish the desired relationship between $E_1$ and $E_2$, and thus to maintain a given fuel-air mass ratio.

In some engine applications, it may be desirable to maintain the fuel flow constant but to vary the air flow to reestablish the relationship of fuel to air mass flow desired to be maintained. In such case, the control would be basically the same as that shown in Fig. 1, the major difference being that the valve 78 would be put in the air line rather than in the fuel line.

Moreover, the control apparatus in substantially the same form as that illustrated in Fig. 1 may be employed where it is desired to establish a ratio of air mass to fuel flow which does not remain constant but rather is scheduled by other parameters, by the addition of other components. For example, a resistor could be placed in parallel with resistor 19 as shown in Fig. 3, and varied in accordance with, for example, the speed of an engine powered vehicle, in the event that it was desired to vary the fuel-mass air ratio in accordance with the vehicle speed.

In Fig. 3, resistor 100, variable with speed is shown as being controlled by a conventional fly-ball type of speed governor 101.

In the control system of Fig. 1, separate structural units are employed for deriving control quantities proportional to dynamic air pressure and air density. Fig. 2 illustrates a practical construction where these two functions are combined in a single unit.

Referring now to Fig. 2, the air density chamber which is similar to that shown in Fig. 1 in that it includes a conductive walled ionization chamber 80, a stationary electrode disc 81 corresponding to electrode 12 of Fig. 1 having a coating 82 of polonium, the disc 81 being carried at one end of a rigid conductive rod 83 which extends through a supporting insulating bushing 84 in the chamber wall, and a tube 85 corresponding to tube 22 in Fig. 1 for placing the interior of casing 80 under static air pressure. As in the Fig. 1 arrangement a source of unidirectional voltage 86 is connected between the walls of chamber 80 and rod 83.

The other and cup shaped electrode 87 is however somewhat different from corresponding electrode 11 of Fig. 1 in that it is constituted by two concentric portions 88, 89 separated by an insulator 90. The outer portion 88 is grounded to the chamber wall 80 by conductor 91, and the inner portion 89 is connected by conductor 92 to output terminal 93 which develops the output signal, due to the current flow, through resistor 94 connected between conductor 91 and the grounded chamber wall 80.

Electrode 87 is not stationary as is electrode 11 but rather is mounted for movement relative to electrode 81 through a bellows unit 95 placed inside of chamber 80. The interior of bellows 95 is connected with a tube 96 which is the functional equivalent of tube 27 in Fig. 1—that is it conveys the dynamic air pressure to the bellows 95 which is accordingly expanded or contracted as the case may be with a rise or fall of the dynamic air pressure. Movement of bellows 95 is transmitted to electrode 87 through a lever system 97 fulcrumed at 98 and so arranged that an increase in dynamic air pressure will cause electrode 87 to move further away from stationary electrode 81 while a decrease in dynamic air pressure will cause electrode 87 to move closer to electrode 81. The relationship between change in dynamic air pressure and displacement of electrode 87 is made linear, and hence the distance X between electrodes 81 and 87 may be made proportional to the dynamic air pressure V. That is, $$X = K_7 \frac{\rho V^2}{2} \qquad (5)$$

The reason for the concentric arrangement of electrodes 88, 89 with the outer portion 88 grounded is to insure substantially linear lines of current flow between electrodes 81 and 89. Under these conditions, and provided that the distance between the electrodes is small as compared to the range of alpha particles emitted from polonium coating 82, the current flowing through electrode 89 will be proportional to the electrode spacing X. Then the current through resistance 94 and thus the voltage at terminal 93 will be directly proportional to $\rho V^2 \div 2$; and at the same time the electrode current will also be proportional to the density $\rho$, since the unit continues to function also as an air density sensing chamber as in the Fig. 1 system. Thus the voltage at terminal 93 is proportional to $$\frac{\rho V^2}{2} \cdot \rho$$

or to the square of the mass air flow, that is, to $$\frac{\rho^2 V^2}{2}$$

To employ the combined mass air flow sensing unit of Fig. 2 in the Fig. 1 system, it is only necessary to connect terminal 93 to input contact 56 on control amplifier 59 in place of the output connection from potentiometer slider 29; i. e. the voltage appearing at terminal 93 is the functional equivalent of voltage $E_1$ in the Fig. 1 system.

The principles of the present invention may also be used to measure true air speed. It will be remembered that in Fig. 1, voltage $E_1$ is equal to IR, i. e. the product of dynamic pressure signal as represented by R and the air density signal as represented by I. To measure true air speed, all that need be done is to divide the former by the latter, i. e. R÷I. This can be accomplished by so designing the potentiometer resistor that its resistance R' between the tap point of the slider element and ground is proportional to the reciprocal of the dynamic air pressure V. This cannot be made to hold true down to zero air speed but it can be made to hold for any desired range of air speed not including zero. In such case $$R' = K_8 \cdot \frac{1}{\rho V^2 \div 2} \qquad (6)$$

Then if the current I' is proportional to $\rho$, as before, the voltage $E_1$ at the tap point on the potentiometer resistor can be expressed by the equation $$E_1' = K_9 \cdot \frac{\rho}{\rho V^2 \div 2}$$

$$= K_{10} \cdot \frac{1}{V^2 \div 2} \qquad (7)$$

It is thus seen that voltage output $E_1'$ is proportional to the reciprocal of the square of the true air speed. If desired, a meter can be employed to read this voltage, the meter scale being calibrated in terms of true air speed.

In conclusion I wish it to be understood that the illustrated embodiments of the invention are typical only of the many possible different constructions which may be employed to put the principles of the invention into practice without departing from the spirit and scope thereof as defined by the appended claims. For example the ionization current factor may be combined with the dynamic pressure factor in other ways to produce either their product or quotient than those specifically described.

I claim:

1. Apparatus for measuring mass flow of a gas comprising an enclosed chamber, a source of ionizing particles within said chamber, means admitting the gas to said chamber at the static pressure thereof, a pair of spaced electrodes within said chamber, means for applying a potential difference to said electrodes for collecting ionized particles, said potential difference producing an electrode current factor proportional to the density of the gas, means producing a second factor proportional to the dynamic pressure of the gas, and means combining said factors to effect the product thereof.

2. Apparatus for measuring mass flow of a gas comprising a source of ionizing particles, means producing a first factor proportional to the ionizing power of the particles which varies proportionally with variation in density of the gas, means producing a second factor proportional to dynamic pressure of the gas, and means combining said factors to produce a third factor constituting a measurement of the gas mass flow and which is the product of said combined factors.

3. Apparatus for measuring mass flow of a gas comprising a chamber, means for admitting the gas to said chamber at the static pressure thereof, a source of ionizing particles in said chamber, a pair of electrodes in said chamber spaced apart, means for applying a potential difference to said electrodes, said electrodes being adapted to collect the ionized particles thereby to produce a flow of current between said electrodes proportional to the density of the gas, a potentiometer resistor, means deriving from said electrode current an input voltage proportional to said current, means applying said input voltage to said resistor, an output tap on said resistor providing a voltage signal representative of the mass flow of gas, and means varying the output voltage tap on said resistor proportionally to variation in dynamic pressure of the gas.

4. Apparatus for measuring mass flow of a gas comprising a chamber, means for admitting the gas to said chamber at the static pressure thereof, a source of ionizing particles in the chamber, a pair of spaced electrodes in said chamber having a potential difference applied thereto and which electrodes serve to collect the ionized particles, and means varying the spacing between said electrodes in accordance with variation in the dynamic pressure of the gas.

5. Apparatus for measuring mass flow of a gas comprising a chamber, means for admitting the gas to said chamber at the static pressure thereof, a source of ionizing particles in the chamber, a pair of spaced electrodes in said chamber, means for applying a difference of potential to said electrodes, said electrodes serving to collect the ionized particles, one of said electrodes being stationary and the other movable, a bellows unit within said chamber, means subjecting the interior of said bellows unit to the dynamic pressure of the gas, and linkage means connecting said bellows unit with said movable electrode.

6. Apparatus for measuring mass flow of a gas comprising an enclosed chamber the walls of which are electrically conductive, first and second electrodes within said chamber arranged in spaced confronting relation, a source of ionizing particles carried by said first electrode on the side facing said second electrode, means for establishing a potential difference between the walls of said chamber and said first electrode, said second electrode being constituted by inner and outer sections insulated from one another, an electrical connection between said outer electrode section and the chamber walls, and an output connection from said inner electrode section.

7. Apparatus for measuring mass flow of a gas as defined in claim 6 wherein said second electrode is mounted for movement relative to said first electrode to vary the spacing therebetween, and means moving said second electrode proportionally to variation in the dynamic pressure of the gas.

8. In a device for controlling the ratio of flow of a liquid to the rate of flow of a gas an organization comprising apparatus for producing a voltage signal representative of the mass flow of a gas as defined in claim 3 in combination with means producing a voltage proportional to liquid flow, means comparing said voltage with the voltage at the output tap on said resistor to produce a third control voltage variable with their difference.

9. Apparatus for measuring flow of a gas comprising an enclosed chamber, a source of ionizing particles within said chamber, means admitting the gas to said chamber at the static pressure thereof, a pair of spaced electrodes within said chamber, means for applying a potential difference to said electrodes for collecting ionized particles, said potential difference producing an electrode current factor proportional to the density of the gas, means producing a second factor functionally related to the dynamic pressure of the gas, and means combining said factors to effect the product thereof.

10. Apparatus for measuring true velocity of a gas comprising an enclosed chamber, a source of ionizing particles within said chamber, means admitting the gas to said chamber at the static pressure thereof, a pair of spaced electrodes within said chamber, means for applying a potential difference to said electrodes for collecting ionized particles, said potential difference producing an electrode current factor proportional to the density of the gas, means producing a second factor proportional to the reciprocal of the dynamic pressure of the gas, and means combining said factors to effect the product thereof.

11. Apparatus as defined in claim 10 for measuring true velocity of a gas wherein said second factor is a resistance proportional to the reciprocal of the dynamic pressure of the gas.

References Cited in the file of this patent

UNITED STATES PATENTS

| | | |
|---|---|---|
| 1,120,214 | Metzdorff | Dec. 8, 1914 |
| 1,602,444 | Naiman | Oct. 12, 1926 |
| 1,697,339 | Baker | Jan. 1, 1929 |
| 1,922,194 | Brown et al | Aug. 15, 1933 |
| 2,052,764 | Harrison | Sept. 1, 1936 |
| 2,252,367 | Germer | Aug. 12, 1941 |
| 2,393,708 | Reichel | Jan. 29, 1946 |
| 2,421,003 | Baker | May 27, 1947 |
| 2,454,520 | Moore | Nov. 23, 1948 |
| 2,488,221 | Moore | Nov. 15, 1949 |
| 2,497,213 | Downing | Feb. 14, 1950 |
| 2,504,772 | White | Apr. 18, 1950 |
| 2,526,635 | Cochran | Oct. 24, 1950 |
| 2,538,824 | Andresen | Jan. 23, 1951 |
| 2,582,647 | Morgan | Jan. 15, 1952 |
| 2,600,151 | Backus | June 10, 1952 |

FOREIGN PATENTS

| | | |
|---|---|---|
| 493,670 | Great Britain | Oct. 12, 1938 |
| 517,321 | Great Britain | Jan. 26, 1940 |